(12) United States Patent
Cheng et al.

(10) Patent No.: US 10,002,728 B2
(45) Date of Patent: Jun. 19, 2018

(54) LIGHT-EMITTING KEYBOARD

(71) Applicant: ALSON TECHNOLOGY LIMITED, Kowloon (HK)

(72) Inventors: Han-Hung Cheng, Zhubei (TW); Chi-Fen Kuo, Zhubei (TW)

(73) Assignee: Alson Technology Limited, Kowloon (HK)

( * ) Notice: Subject to any disclaimer, the term of this patent is extended or adjusted under 35 U.S.C. 154(b) by 108 days.

(21) Appl. No.: 15/284,849

(22) Filed: Oct. 4, 2016

(65) Prior Publication Data
US 2018/0096805 A1    Apr. 5, 2018

(51) Int. Cl.
G01D 11/28        (2006.01)
*H01H 13/83*      (2006.01)
*F21V 23/04*      (2006.01)

(52) U.S. Cl.
CPC ............. *H01H 13/83* (2013.01); *F21V 23/04* (2013.01); *H01H 2219/036* (2013.01)

(58) Field of Classification Search
CPC ... H01H 13/83; H01H 2219/036; F21V 23/04
See application file for complete search history.

(56) References Cited

U.S. PATENT DOCUMENTS

2012/0012448 A1* 1/2012 Pance ............... H01H 13/83 200/5 A
2016/0284493 A1* 9/2016 Chen ................ H01H 13/83

FOREIGN PATENT DOCUMENTS

TW       I508119 B    11/2015

* cited by examiner

*Primary Examiner* — Anh Mai
*Assistant Examiner* — Glenn Zimmerman
(74) *Attorney, Agent, or Firm* — Muncy, Geissler, Olds & Lowe, P.C.

(57) ABSTRACT

A light-emitting keyboard is provided, including a keyboard module and a light-emitting module. The keyboard module has a light-penetrable portion and a keyboard base, and the light-penetrable portion is arranged on the keyboard base. The light-emitting module is attached to the keyboard base and includes a substrate, a boost circuit and a plasma tube, the boost circuit is disposed on the substrate, the plasma tube has a light-emitting main body and two electrodes, the light-emitting main body at least partly corresponds to the light-penetrable portion, and the two electrodes are connected to the light-emitting main body and respectively electrically connected to the two power output portions.

10 Claims, 9 Drawing Sheets

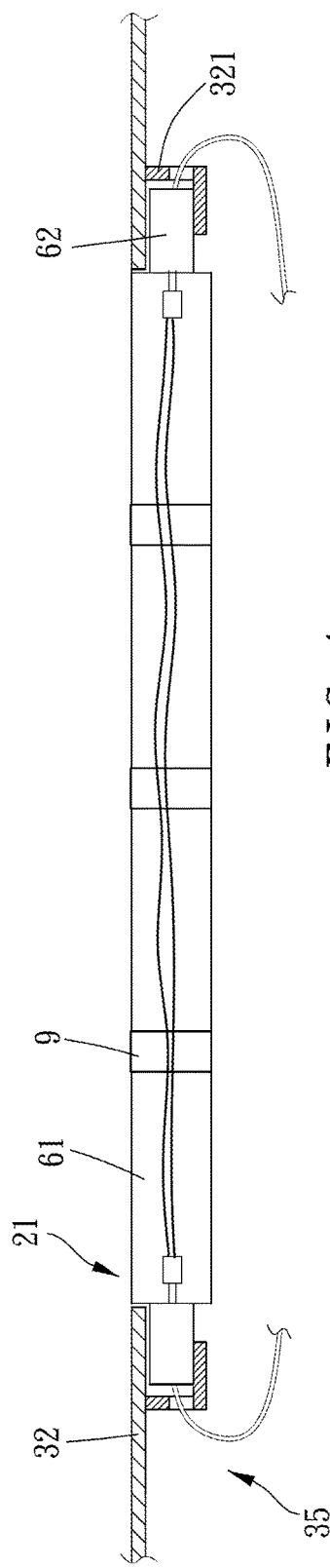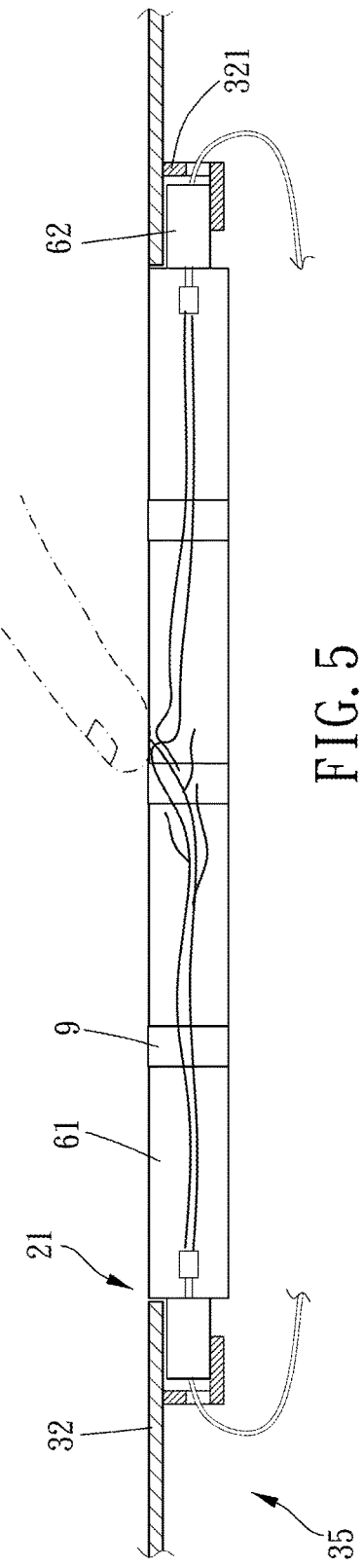

LIGHT-EMITTING KEYBOARD

BACKGROUND OF THE INVENTION

Field of the Invention

The present invention relates to a light-emitting keyboard.

Description of the Prior Art

A conventional keyboard is simply an input device, and as computer becomes widely popular, the conventional keyboard is gradually unable to meet consumers' requirements. Therefore, a keyboard having a light source is provided so that a user can recognize the characters or functions of keycaps in an environment where light is weak. This type of light-emitting keyboard is disclosed in TWI508119.

However, this type of light-emitting keyboard often uses a light-emitting diode, it is understandable that the light-emitting diode is a light-emitting component which has higher illuminating efficiency, and when light emitted by the light-emitting diode enters a user's eyes, s/he may feel uncomfortable. Therefore, most of the keyboards are provided with a backlight module, but in this way, the user cannot see a surface of the keycap clearly, or the keyboard or the keycap need to use a more complex structure to guide the light and soften the light, and this type of keyboard is more complex and costly to be processed.

The present invention has arisen to mitigate and/or obviate the afore-described disadvantages.

SUMMARY OF THE INVENTION

The major object of the present invention is to provide a light-emitting keyboard, which can light up keycaps so that a user can see the keycaps clearly, and his/her eyes do not feel uncomfortable. In addition, during a manufacturing process, the keyboard does not need to undergo light-guiding or light-softening processes so that a manufacturing difficulty is lowered, and a complexity of the keyboard structure is decreased.

To achieve the above and other objects, a light-emitting keyboard is provided, including a keyboard module and a light-emitting module. The keyboard module has a light-penetrable portion and a keyboard base, the light-penetrable portion is arranged on the keyboard base, the keyboard base has a base, a cover, a circuit substrate and a plurality of keycaps, the cover covers the base, the cover and the base define an interior space, the circuit substrate is for being electrically connected to a first power source and disposed in the interior space, each said keycap is reciprocatably positioned on the cover, and the keycaps are for being optionally pressed to actuate a part of the circuit substrate. The light-emitting module is attached to the keyboard base and includes a substrate, a boost circuit and a plasma tube, the boost circuit is disposed on the substrate, the boost circuit includes at least one conductive line and a plurality of electronic components, the electronic components are electrically connected to the at least one conductive line, the at least one conductive line includes a power input portion and two power output portions, the power input portion is for being electrically connected to a second power source, the plasma tube has a light-emitting main body and two electrodes, the light-emitting main body at least partly corresponds to the light-penetrable portion, and the two electrodes are connected to the light-emitting main body and respectively electrically connected to the two power output portions.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIGS. 4 and 5 are cross-sectional side views of FIGS. 1 and 2 respectively.

DETAILED DESCRIPTION OF THE PREFERRED EMBODIMENTS

Figure 1:
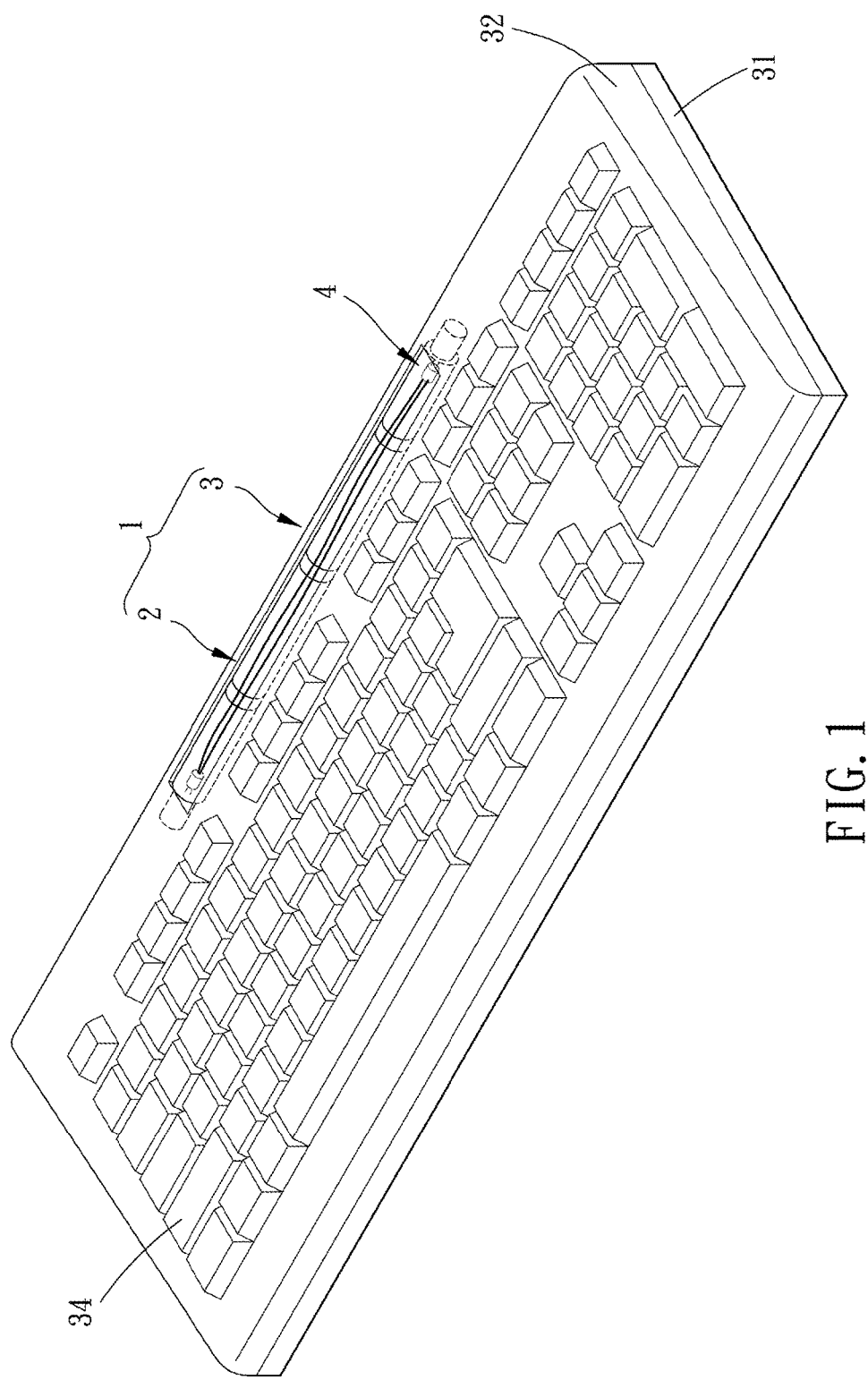
FIGS. 1 and 2 are stereograms of an embodiment of the present invention.
Figure 2:
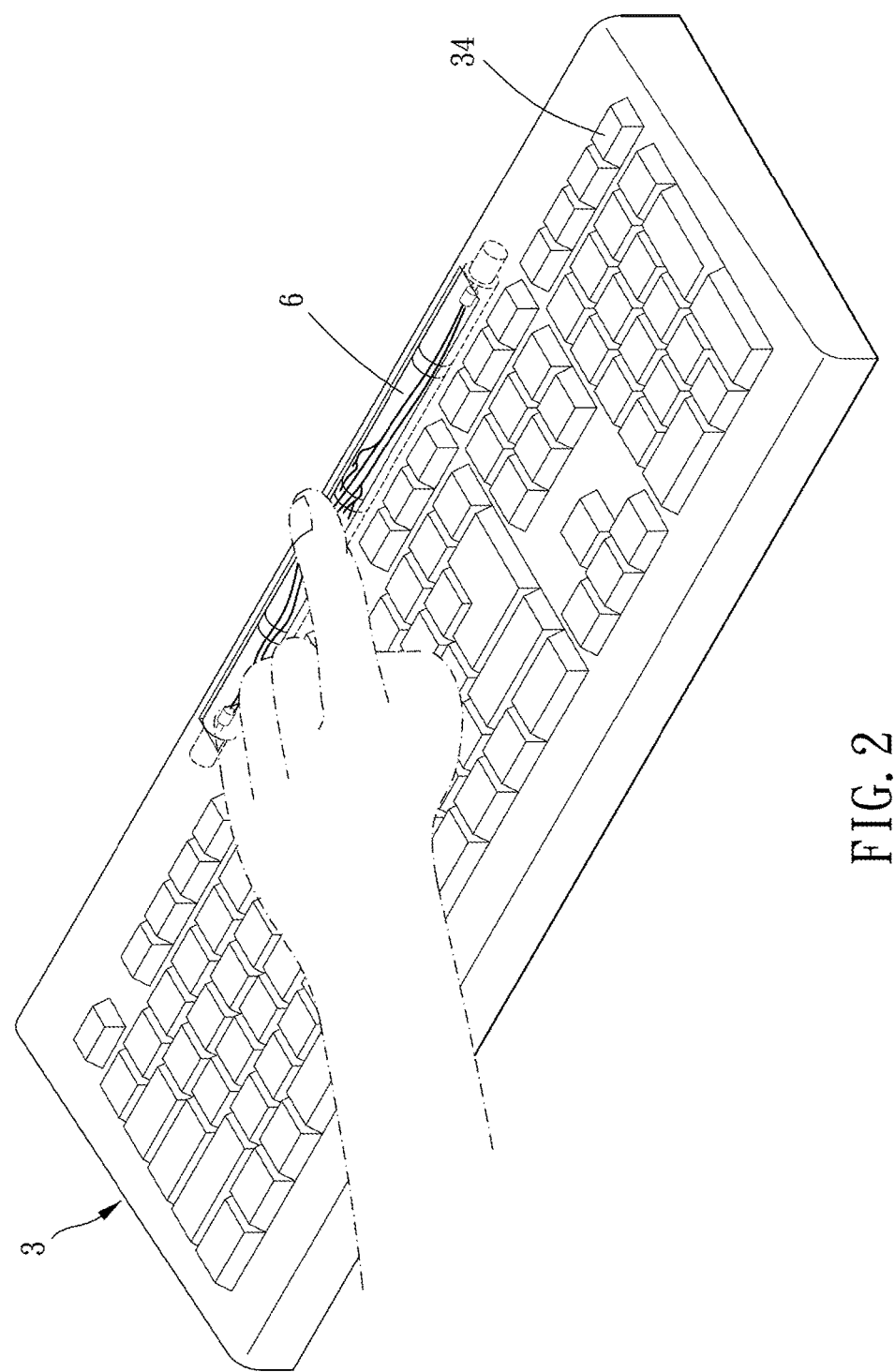
Figure 3:
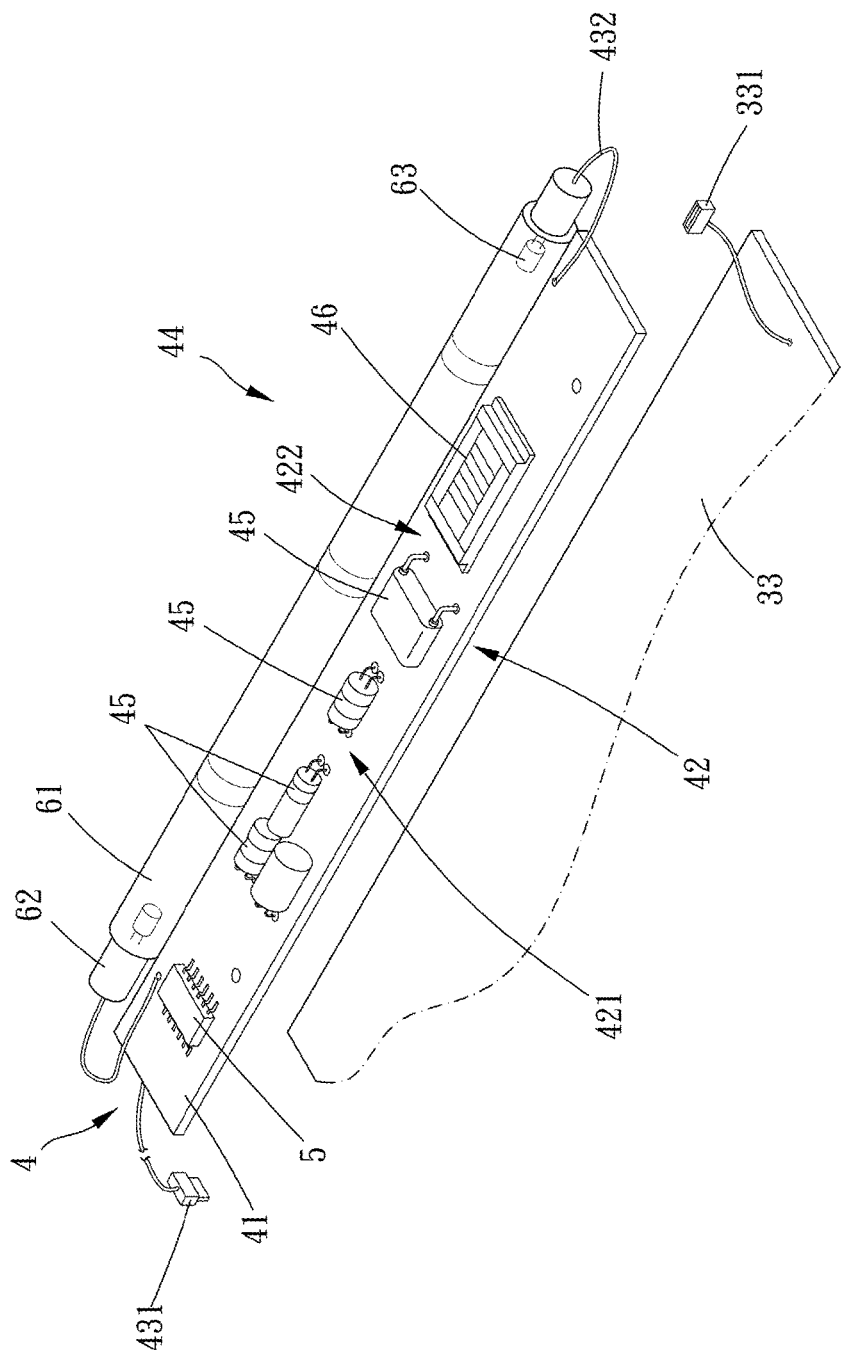
FIG. 3 is a partial breakdown view of FIG. 1.
Figure 6:
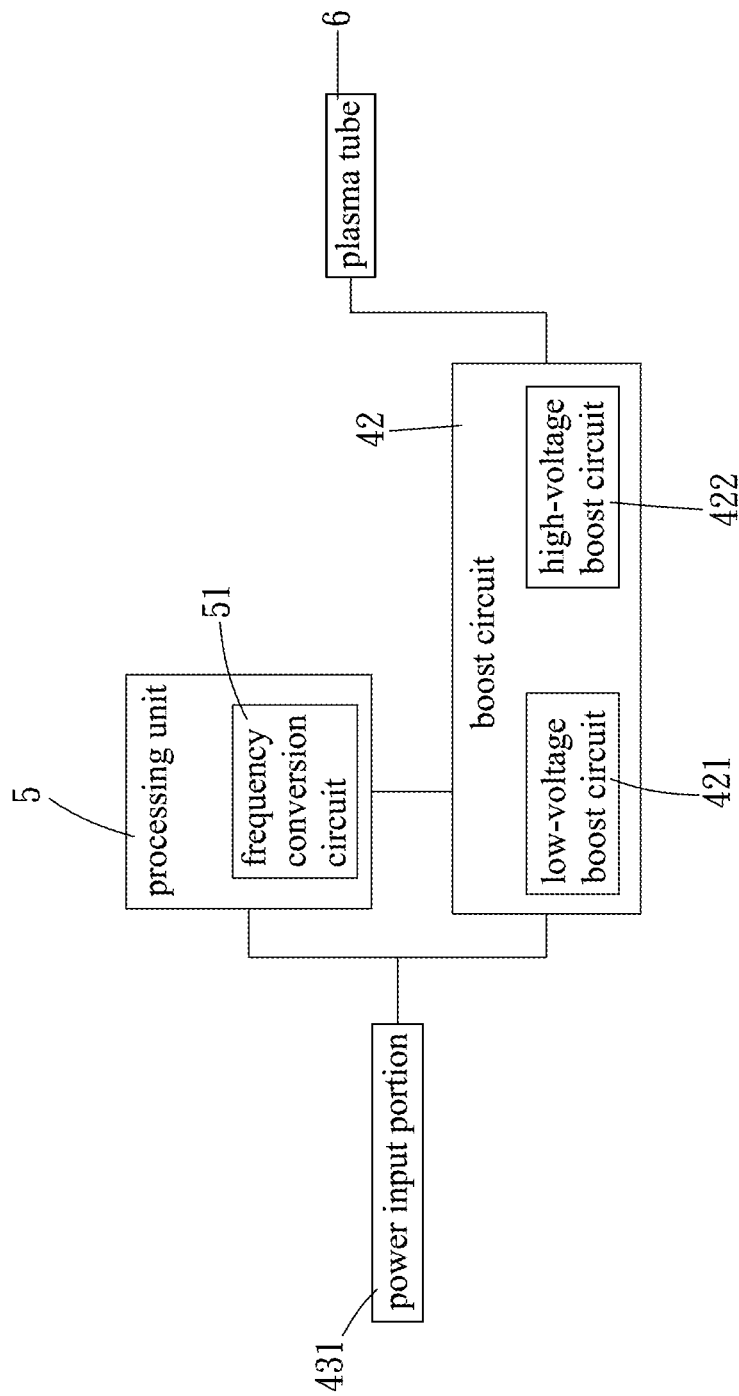
FIG. 6 is a diagram showing a relation of a light-emitting module of the embodiment of the present invention.

The present invention will be clearer from the following description when viewed together with the accompanying drawings, which show, for purpose of illustrations only, the preferred embodiment in accordance with the present invention.

Please refer to FIGS. 1 to 6 for an embodiment of the present invention. A light-emitting keyboard includes a keyboard module 1 and a light-emitting module 4.

The keyboard module 1 has a light-penetrable portion 2 and a keyboard base 3, the light-penetrable portion 2 is arranged on the keyboard base 3, the keyboard base 3 has a base 31, a cover 32, a circuit substrate 33 and a plurality of keycaps 34, the cover 32 covers the base 31, the cover 32 and the base 31 define an interior space 35, the circuit substrate 33 is for being electrically connected to a first power source and disposed in the interior space 35, each said keycap 34 is reciprocatably positioned on the cover 32, and the keycaps 34 are for being optionally pressed to actuate a part of the circuit substrate 33.

The light-emitting module 4 is attached to the keyboard base 3 and includes a substrate 41, a boost circuit 42 and a plasma tube 6, the boost circuit 42 is disposed on the substrate 41, the boost circuit 42 includes at least one conductive line and a plurality of electronic components 44, the electronic components 44 are electrically connected to the at least one conductive line, the at least one conductive line includes a power input portion 431 and two power output portions 432, the power input portion 431 is for being electrically connected to a second power source, the plasma tube 6 has a light-emitting main body 61 and two electrodes 62, the light-emitting main body 61 at least partly corresponds to the light-penetrable portion 2, and the two electrodes 62 are connected to the light-emitting main body 61 and respectively electrically connected to the two power output portions 432.

Specifically, the conductive line is buried in the substrate 41, and the substrate 41 and the conductive lines define a printing circuit board; and of course, the conductive lines may be arranged on the substrate 41 in other ways. The boost circuit 42 transfers a low-voltage direct current which is input by the power input portion 431 to a high-voltage alternating current and supplies the high-voltage alternating current through the two power output portions 432 to the plasma tube 6. The boost circuit 42 may transfer the low-voltage direct current into a light-voltage pulsed direct current.

More specifically, the circuit substrate 33 has a power supply end 331, and the power input portion 431 is electrically connected to the power supply end 331. In other words, in this embodiment, the first and second power sources are the same, the first power source provides power through the circuit substrate 33 to the light-emitting module 4. In other embodiments, the first and second power sources may be independently separated from each other. In addition, the two electrodes 62 are disposed on two opposite ends of the light-emitting main body 61, the light-emitting main body 61 and the two electrodes 62 are coaxially arranged, and the light-emitting main body 61 is greater than each said electrode 62 in radial dimension. Each said electrode 62 includes an electrode cap tube 63 which is located in the light-emitting main body 61 and is hollow, and the two electrode cap tubes 63 are substantially coaxially arranged so that light can be emitted from a periphery of the electrode cap tubes 63 and distributed evenly.

More specifically, the light-emitting module 4 further includes a processing unit 5 which is disposed on the substrate 41, the processing unit 5 includes an frequency conversion circuit 51 which is electrically connected to the power input portion 431 and the boost circuit 42, the frequency conversion circuit 51 is used to transfer an input power source which has a first frequency from the power input portion 431 to at least one output power source which has a second frequency and an output power source which has a third frequency, the at least one output power source having the second frequency and the output power source having the third frequency are transmitted to the boost circuit 42 in a preset sequence, the first frequency and the second frequency are different, and the second frequency and the third frequency are different; therefore, the plasma tube 6 produces the light which waves continuously based on the power sources having different frequencies input by the boost circuit 42.

The plurality of electronic components 44 include a plurality of passive components 45 and at least one transformer 46, and the plurality of passive components 45 are electrically connected to one another to form a low-voltage boost circuit 421 which is electrically connected to the power input portion 431 and the processing unit 5 so as to boost the power source provided by the circuit substrate 33, for example, from 1.5-3.5V to 12-15V. The at least one transformer 46 forms a high-voltage boost circuit 422 which is electrically connected between the low-voltage boost circuit 421 and the two power output ends so as to transfer a low-voltage power to a high-voltage power, for example, from 12-15V to 700-900V, for the plasma tube 6 to use.

In this embodiment, the light-emitting module 4 is disposed in the interior space 35, the cover 32 has the light-penetrable portion 2, the light-penetrable portion 2 is a through hole 21, and the light-emitting main body 61 is exposed from the through hole 21 and non-protrusive beyond the cover 32. Therefore, the light emitted by the light-emitting main body 61 can directly and clearly light up the keycaps 34 and a part of surroundings of the keyboard 1 so that the user can see the keycaps 34 clearly in an environment where light is weak, and the user's eyes will not feel uncomfortable. In addition, this type of structure is simply designed, so the manufacturing difficulty is lowered, and the complexity of the keyboard structure is decreased. It is to be noted that when a finger of a human body touches the light-emitting main body 61, the light in the light-emitting main body 61 undergoes electronic neutralization (when the human body functions as a grounding wire), a part of the light is guided to a place that the finger touches so as to produce a specific light path, and the through hole 21 allows the user to directly touch the light-emitting main body 61 conveniently to produce the above-mentioned effect.

It is to be noted that with the design that the light-emitting main body 61 does not protrude beyond the cover 32, the keycaps 34 are lighted up, and the light-emitting main body 61 can be effectively prevented from being impacted unexpectedly so as to protect a structural integrity of the light-emitting main body 61. Preferably, the cover 32 further has a positioning portion 321 which is positioned on the plasma tube 6 so as to prevent the plasma tube 6 from moving relative to the cover 32 to avoid impacts. Preferably, in an opening direction of the through hole 21, the cover 32 covers the two electrodes 62 completely so as to prevent the user from touching the electrode 62 and experiencing an electric shock and to block objects from attaching on each said electrode 62. More preferably, the light-emitting module 4 further includes at least one protecting member 9, and each said protecting member 9 covers at least a part of the light-emitting main body 61 so as to prevent objects from impacting the light-emitting main body 61 and to absorb or disperse the impact to protect the light-emitting main body 61. Specifically, each said protecting member 9 is preferably made of a transparent material so as to provide a preferable light-penetrating effect.

In this embodiment, a number of the at least one protecting member 9 is three, and the protecting members 9 are arranged equidistantly. The light-emitting main body 61 is arranged along a longitudinal direction of the cover 32, a longitudinal dimension of the light-emitting main body 61 is half of a longitudinal dimension of the cover 32 so that the keycaps 34 can be thoroughly lighted up. In addition, in an axial direction of the light-emitting main body 61, the cover 32 abuts against the light-emitting main body 61 to cover the two electrodes 62 completely.

Figure 7:
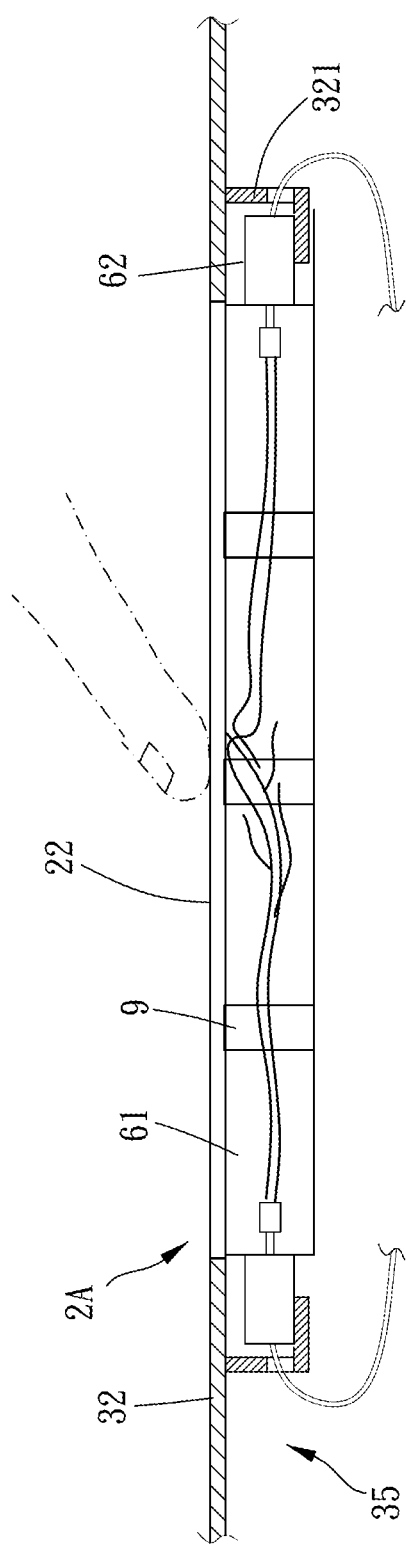
FIG. 7 is a cross-sectional side view of another embodiment of the present invention.

It is understandable that the light-penetrable portion 2 may be in other modes. Please refer to FIG. 7 for another embodiment, a light-penetrable portion 2A is a cover board 22 which is made of a transparent material, and the light-emitting module 4 is disposed in the interior space 35 and located between the light-penetrable portion 2A and the base 31 so that the cover board 22 can protect the light-emitting main body 61 thoroughly. Preferably, the light-emitting main body 61 is disposed near the light-penetrable portion 2A to prevent the cover board 22 from influencing a special effect which human body triggers and guides the light, for example, the light-emitting main body 61 contacts the cover board 22 tightly. It is understandable that in other embodiments, the cover board may be a part of the cover, and in other words, the whole cover may be made of the transparent material.

Figure 8:
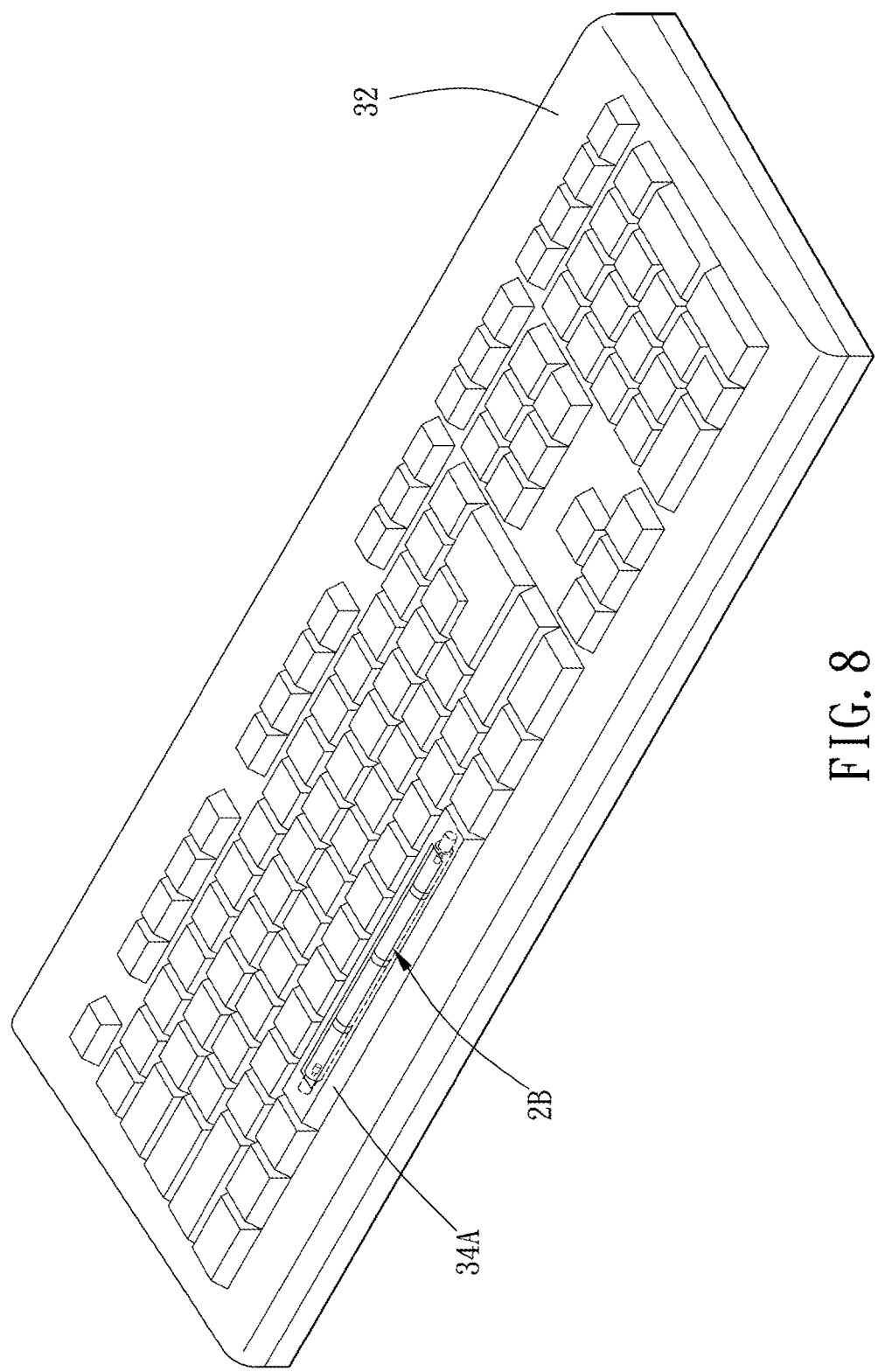
FIG. 8 is a stereogram of still another embodiment of the present invention.
Figure 9:
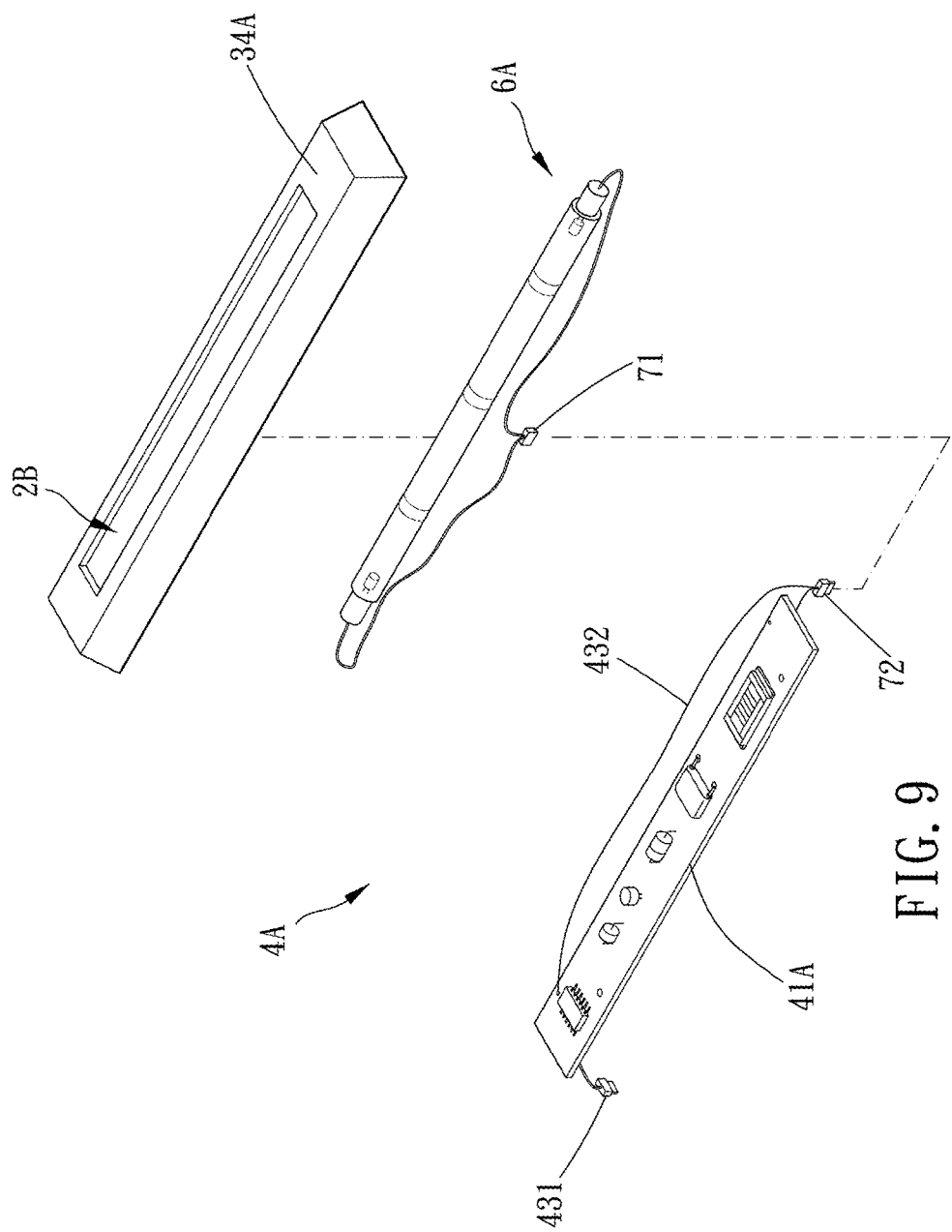
FIG. 9 is a partial breakdown view of FIG. 8.
Figure 10:
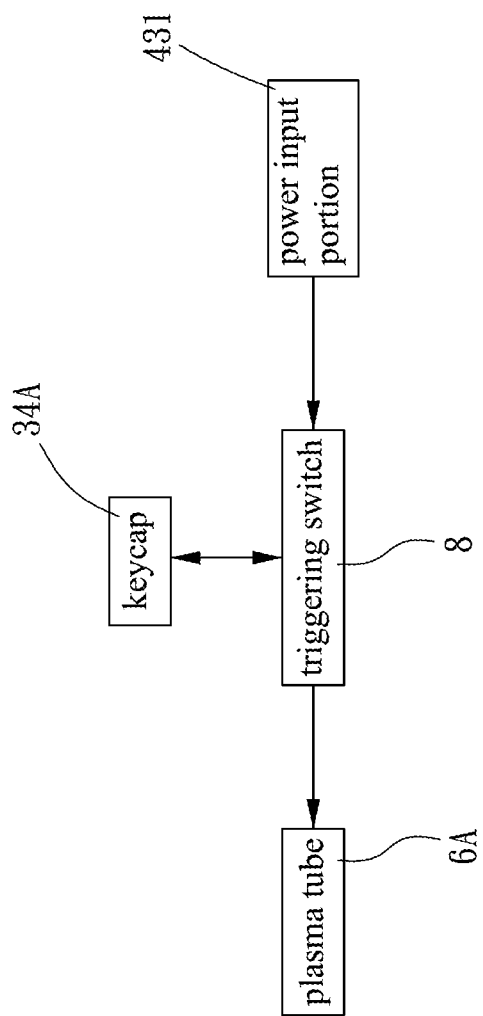
FIG. 10 is a diagram showing a relation of a triggering switch of still another embodiment of the present invention.

It is to be noted that the light-penetrable portion 2A may be arranged on other places, and the plasma tube 6 may be arranged on any place of the keyboard base 3 in accordance with various requirements. For example but not limited thereto, as shown in still another embodiment in FIGS. 8 to 10, it is understandable that a keycap 34A and the cover 32 define a receiving space, a plasma tube 6A is arranged in the receiving space, and the keycap 34A has a light-penetrable portion 2B. In this embodiment, the keycap 34A is a space bar.

Due to a restriction of the receiving space, a substrate 41A is preferably disposed in the interior space 35, and in order to let the user assemble/disassemble the plasma tube 6A conveniently, the plasma tube 6A further has a first plug module 71 which is electrically connected to the two electrodes 62, a light-emitting module 4A further has a second plug module 72 which is electrically connected to the first plug module 71, and the second plug module 72 has the two power output portions 432 so that the user can quickly plug and unplug.

Furthermore, the light-emitting module 4A further has a triggering switch 8, the triggering switch 8 optionally electrically connects the power input portion 431 and the plasma tube 6A, and the triggering switch 8 is used to detect movements of the keycaps 34A. When one said keycap 34A is pressed to move downward to a predetermined position, the triggering switch 8 electrically connects the power input portion 431 and the plasma tube 6A; otherwise, the triggering switch 8 does not electrically connect the power input portion 431 and the plasma tube 6A. It is understandable that the embodiments mentioned above may cooperate with each other to develop various modes.

Given the above, the light-emitting keyboard can light up the keyboard module and the surroundings so that the user can use the light-emitting keyboard in the dark. In addition, since the light directly shines on a surface of the keycap, the user can see the keycap clearly. Besides, the cover covers the electrode to protect the user from experiencing electronic shock, the plasma tube does not protrude beyond the through hole to lower a change that the plasma tube is touched, and the light-emitting main body is covered by the protecting member to elevate an anti-collision ability.

While we have shown and described various embodiments in accordance with the present invention, it should be clear to those skilled in the art that further embodiments may be made without departing from the scope of the present invention.

What is claimed is:

1. A light-emitting keyboard, including:
    a keyboard module, having a light-penetrable portion and a keyboard base, the light-penetrable portion being arranged on the keyboard base, the keyboard base having a base, a cover, a circuit substrate and a plurality of keycaps, the cover covering the base, the cover and the base defining an interior space, the circuit substrate for being electrically connected to a first power source and disposed in the interior space, each said keycap being reciprocatably positioned on the cover, the keycaps for being optionally pressed to actuate a part of the circuit substrate;
    a light-emitting module, attached to the keyboard base, including a substrate, a boost circuit and a plasma tube, the boost circuit disposed on the substrate, the boost circuit including at least one conductive line and a plurality of electronic components, the electronic components being electrically connected to the at least one conductive line, the at least one conductive line including a power input portion and two power output portions, the power input portion for being electrically connected to a second power source, the plasma tube having a light-emitting main body and two electrodes, the light-emitting main body at least partly corresponding to the light-penetrable portion, the two electrodes being connected to the light-emitting main body and respectively electrically connected to the two power output portions.

2. The light-emitting keyboard of claim 1, wherein the light-emitting module is disposed in the interior space, the cover has the light-penetrable portion, the light-penetrable portion is a through hole, the light-emitting main body is exposed from the through hole and non-protrusive beyond the cover, and in an opening direction of the through hole, the cover covers the two electrodes completely.

3. The light-emitting keyboard of claim 1, wherein the cover has the light-penetrable portion, the light-penetrable portion is a cover board made of a light-penetrable material, the light-emitting module is disposed in the interior space and located between the light-penetrable portion and the base, and the light-emitting main body is near the light-penetrable portion.

4. The light-emitting keyboard of claim 1, wherein the keycap and the cover define a receiving space, the plasma tube is arranged in the receiving space, and the keycap has the light-penetrable portion.

5. The light-emitting keyboard of claim 1, wherein the light-emitting module further has a triggering switch, the triggering switch optionally electrically connects the power input portion and the plasma tube, the triggering switch is used to detect movements of the keycaps; wherein when one said keycap is pressed to move downward to a predetermined position, the triggering switch electrically connects the power input portion and the plasma tube; otherwise, the triggering switch electrically disconnects the power input portion and the plasma tube.

6. The light-emitting keyboard of claim 1, wherein the light-emitting module further includes a processing unit which is disposed on the substrate, the processing unit includes a frequency conversion circuit which is electrically connected to the power input portion and the boost circuit, the frequency conversion circuit is used to transfer an input power source which has a first frequency from the power input portion to at least one output power source which has a second frequency and an output power source which has a third frequency, the at least one output power source having the second frequency and the output power source having the third frequency are transmitted to the boost circuit in a preset sequence, the first frequency and the second frequency are different, and the second frequency and the third frequency are different.

7. The light-emitting keyboard of claim 1, wherein the light-emitting module further includes at least one protecting member, and each said protecting member covers at least a part of the light-emitting main body.

8. The light-emitting keyboard of claim 1, wherein the plurality of electronic components include a plurality of passive components and at least one transformer, the plurality of passive components are electrically connected to one another to form a low-voltage boost circuit which is electrically connected to the power input portion and the processing unit, the at least one transformer forms a high-voltage boost circuit which is electrically connected between the low-voltage boost circuit and the two power output ends.

9. The light-emitting keyboard of claim 4, wherein the plasma tube further has a first plug module which is electrically connected to the two electrodes, the light-emitting module further has a second plug module which is electrically connected to the first plug module, and the second plug module has the two power output portions.

10. The light-emitting keyboard of claim 8, wherein the cover further has a positioning portion which is positioned on the plasma tube; the light-emitting module is disposed in the interior space, the cover has the light-penetrable portion, the light-penetrable portion is a through hole, the light-emitting main body is exposed from the through hole and non-protrusive beyond the cover, and in an opening direction of the through hole, the cover covers the two electrodes completely; the light-emitting main body is arranged along a longitudinal direction of the cover, a longitudinal dimension of the light-emitting main body is half of a longitudinal dimension of the cover, the two electrodes are disposed on two opposite ends of the light-emitting main body, the light-emitting main body and the two electrodes are coaxially arranged, and the light-emitting main body is greater than each said electrode in radial dimension; in an axial direction of the light-emitting main body, the cover abuts against the light-emitting main body; the light-emitting module further includes a processing unit which is disposed on the substrate, the processing unit includes an frequency conversion circuit which is electrically connected to the power input portion and the boost circuit, the frequency conversion circuit is used to transfer an input power source which has a first frequency from the power input portion to at least one output power source which has a second frequency and an output power source which has a third frequency, the at least one output power source having the second frequency and the output power source having the third frequency are transmitted to the boost circuit in a preset sequence, the first frequency and the second frequency are different, and the second frequency and the third frequency are different; the light-emitting module further includes at least two protecting members, and each said protecting member covers at least a part of the light-emitting main body; each said protecting member is made of a transparent material; and the protecting members are arranged equidistantly; each said electrode includes an electrode cap tube which is located in the light-emitting main body and is hollow, and the two electrode cap tubes are substantially coaxially arranged; the circuit substrate has a power supply end, and the power input portion is electrically connected to the power supply end; the light-emitting module further has a triggering switch, the triggering switch optionally electrically connects the power input portion and the plasma tube, the triggering switch is used to detect movements of the keycaps; wherein when one said keycap is pressed to move downward to a predetermined position, the triggering switch electrically connects the power input portion and the plasma tube; otherwise, the triggering switch electrically disconnects the power input portion and the plasma tube.

\* \* \* \* \*